United States Patent
Ohno et al.

(10) Patent No.: US 8,232,227 B2
(45) Date of Patent: Jul. 31, 2012

(54) HONEYCOMB STRUCTURED BODY

(75) Inventors: Kazushige Ohno, Gifu (JP); Masafumi Kunieda, Gifu (JP); Kazutake Ogyu, Gifu (JP)

(73) Assignee: Ibiden Co., Ltd., Gifu (JP)

( * ) Notice: Subject to any disclaimer, the term of this patent is extended or adjusted under 35 U.S.C. 154(b) by 1017 days.

(21) Appl. No.: 11/298,510

(22) Filed: Dec. 12, 2005

(65) Prior Publication Data

US 2006/0292044 A1 Dec. 28, 2006

(30) Foreign Application Priority Data

Jun. 24, 2005 (WO) .................. PCT/JP2005/011608

(51) Int. Cl.
*B01D 50/00* (2006.01)
*B01D 53/34* (2006.01)
*B01J 21/02* (2006.01)
*B01J 21/04* (2006.01)
*B32B 1/00* (2006.01)
*B32B 3/28* (2006.01)

(52) U.S. Cl. ........ 502/439; 422/168; 422/180; 502/202; 428/116; 428/177; 428/168

(58) Field of Classification Search .................... 55/523, 55/502; 428/327; 423/247
See application file for complete search history.

(56) References Cited

U.S. PATENT DOCUMENTS

| | | | |
|---|---|---|---|
| 4,749,671 A * | 6/1988 | Saito et al. ........................ 502/64 |
| 4,953,627 A * | 9/1990 | Ito et al. ............................. 165/8 |
| 5,518,678 A | 5/1996 | Miyamoto et al. |
| 5,914,187 A * | 6/1999 | Naruse et al. .................. 428/327 |
| 6,066,587 A | 5/2000 | Kurokawa et al. |
| 6,149,877 A | 11/2000 | Ogai |
| 6,159,578 A | 12/2000 | Ichikawa |
| 6,669,751 B1 | 12/2003 | Ohno et al. |
| 6,764,743 B2 | 7/2004 | Kato et al. |
| 7,316,722 B2 | 1/2008 | Komori et al. |
| 2002/0197193 A1* | 12/2002 | Harada et al. .................. 422/177 |
| 2003/0170160 A1* | 9/2003 | Morita et al. .................. 423/247 |
| 2005/0025933 A1 | 2/2005 | Masukawa et al. |

(Continued)

FOREIGN PATENT DOCUMENTS

DE 43 41 159 A1 6/1995

(Continued)

OTHER PUBLICATIONS

Kazushige Ohno et al.; "Honeycomb Structured Body and Exhaust Gas Converting Apparatus"; U.S. Appl. No. 11/296,494, filed Dec. 8, 2005.

(Continued)

*Primary Examiner* — Melvin C Mayes
*Assistant Examiner* — Guinever Gregorio
(74) *Attorney, Agent, or Firm* — Finnegan, Henderson, Farabow, Garrett & Dunner, LLP

(57) ABSTRACT

A honeycomb structured body of the present invention is a honeycomb structured body in which plural pillar-shaped honeycomb units are bonded to one another through sealing material layers, each unit having in the longitudinal direction a large number of cells placed in parallel with a cell wall therebetween. Herein, a cross-sectional area of the honeycomb unit on a cross-section perpendicular to the length direction is at least about 5 cm$^2$ and at most about 50 cm$^2$, the honeycomb unit includes inorganic fibers and/or whiskers in addition to inorganic particles, and a Young's modulus of the honeycomb unit is at least about 50% and at most about 150% of a Young's modulus of the sealing material layer.

24 Claims, 6 Drawing Sheets

U.S. PATENT DOCUMENTS

| | | | |
|---|---|---|---|
| 2005/0076626 | A1 | 4/2005 | Kudo et al. |
| 2005/0109023 | A1 | 5/2005 | Kudo et al. |
| 2005/0227869 | A1 | 10/2005 | Ohno et al. |
| 2005/0247038 | A1 | 11/2005 | Takahashi |
| 2005/0266992 | A1 | 12/2005 | Ohno et al. |
| 2006/0172113 | A1 | 8/2006 | Kunieda |
| 2006/0177629 | A1 | 8/2006 | Kunieda |
| 2006/0263574 | A1 | 11/2006 | Tsunekawa et al. |
| 2006/0292332 | A1 | 12/2006 | Ohno et al. |
| 2006/0292333 | A1 | 12/2006 | Ohno et al. |
| 2006/0292334 | A1 | 12/2006 | Ohno et al. |
| 2006/0292335 | A1 | 12/2006 | Ohno et al. |
| 2006/0292337 | A1 | 12/2006 | Ohno et al. |
| 2006/0292338 | A1 | 12/2006 | Ohno et al. |
| 2006/0292339 | A1 | 12/2006 | Ohno et al. |
| 2006/0292340 | A1 | 12/2006 | Ohno et al. |
| 2006/0292341 | A1 | 12/2006 | Ohno et al. |
| 2006/0292342 | A1 | 12/2006 | Ohno et al. |
| 2006/0292393 | A1 | 12/2006 | Kunieda |
| 2007/0004593 | A1 | 1/2007 | Ohno et al. |
| 2007/0039295 | A1 | 2/2007 | Ohno |
| 2007/0077190 | A1 | 4/2007 | Ohno |
| 2008/0118682 | A1 | 5/2008 | Ido et al. |
| 2008/0118701 | A1 | 5/2008 | Ohno et al. |
| 2008/0119355 | A1 | 5/2008 | Ohno et al. |
| 2008/0176028 | A1 | 7/2008 | Ohno et al. |
| 2008/0187713 | A1 | 8/2008 | Ohno et al. |
| 2008/0241003 | A1 | 10/2008 | Ido et al. |
| 2008/0241005 | A1 | 10/2008 | Ido et al. |
| 2008/0241008 | A1 | 10/2008 | Ido et al. |
| 2008/0260991 | A1 | 10/2008 | Konstandopoulos et al. |

FOREIGN PATENT DOCUMENTS

| | | |
|---|---|---|
| EP | 1 142 619 | 10/2001 |
| EP | 1 249 262 A1 | 10/2002 |
| EP | 1 384 508 | 1/2004 |
| EP | 1 447 535 | 8/2004 |
| EP | 1 479 881 | 11/2004 |
| EP | 1 479 882 A1 | 11/2004 |
| EP | 1 674 147 | 6/2006 |
| JP | 2-93297 | 4/1990 |
| JP | 2505261 | 4/1990 |
| JP | 5-213681 | 8/1993 |
| JP | 8012460 | 1/1996 |
| JP | 250261 | 4/1996 |
| JP | 10-263416 | 10/1998 |
| JP | 2000-102709 | 4/2000 |
| JP | 2001-096116 | 4/2001 |
| JP | 2001-097777 | 4/2001 |
| JP | 2001-190916 | 7/2001 |
| JP | 2001-329836 | 11/2001 |
| JP | 2002-326034 | 11/2002 |
| JP | 2003-155908 | 5/2003 |
| JP | 2004-051384 | 2/2004 |
| WO | WO-03/067041 A1 | 8/2003 |
| WO | WO-03/067042 A1 | 8/2003 |
| WO | WO-2005/063653 A1 | 7/2005 |
| WO | WO-2005/075075 A1 | 8/2005 |

OTHER PUBLICATIONS

Kazushige Ohno et al.; "Honeycomb Structure Body"; U.S. Appl. No. 11/298,833, filed Dec. 12, 2005.

Kazushige Ohno et al.; "Honeycomb Structured Body, Manufacturing Device of Honeycomb Structured Body and Manufacturing Method of Honeycomb Structured Body"; U.S. Appl. No. 11/320,689, filed Dec. 30, 2005.

Kazushige Ohno et al.; "Honeycomb Structured Body and Method of Manufacturing the Same"; U.S. Appl. No. 11/335,660, filed Jan. 20, 2006.

International Preliminary Report on Patentability, dated Dec. 24, 2007 on International Application No. PCT/JP2005/011608 (4 pgs.).

U.S. Appl. No. 11/853,658.
U.S. Appl. No. 11/928,546.
U.S. Appl. No. 12/194,888.
U.S. Appl. No. 12/238,057.
U.S. Appl. No. 12/245,821.
U.S. Appl. No. 12/246,899.
U.S. Appl. No. 12/246,881.
U.S. Appl. No. 12/239,342.
U.S. Appl. No. 12/246,913.
U.S. Appl. No. 12/246,869.
U.S. Appl. No. 12/248,647.
U.S. Appl. No. 12/248,675.

XP002375248 (for JP 5-213618) Kawata Seisakusho KK.

Saint-Gobain Norpro "Catalytic Products" PowerPoint, Saint-Gobain Norpro "Catalytic Products" http://www.saint-gobain.co.jp/html_jp/product/norpro/norpro_ref.pdf (whole Japanese document, whole English document, and partial translation (3 documents)).

Japanese Office Action in corresponding Application No. 2006-124037 mailed Mar. 1, 2011.

* cited by examiner

HONEYCOMB STRUCTURED BODY

CROSS-REFERENCE TO RELATED APPLICATIONS

This application claims benefit of priority based on PCT/JP2005/011608 filed on Jun. 24, 2005. The contents of this application are incorporated herein by reference in their entirety.

BACKGROUND OF THE INVENTION

1. Field of the Invention

The present invention relates to a honeycomb structured body.

2. Discussion of the Background

In order to purify exhaust gases discharged from internal combustion engines of vehicles, construction machines and the like, such as buses, trucks and the like, a honeycomb catalyst that allows the exhaust gases to pass through the inside thereof to purify the exhaust gases has been used. Conventionally, for example, there has been proposed a honeycomb catalyst having a structure in which a high specific surface area material such as active alumina and the like and catalyst metal such as platinum and the like are supported on a surface of a cordierite-based honeycomb structured body that has an integral structure and a low thermal expansion property. There has been also provided a honeycomb catalyst having a structure in which an alkaline-earth metal such as Ba or the like is supported thereon as a NOx occlusion agent, so as to be used for treating NOx in an atmosphere with excessive oxygen such as an atmosphere in a lean burn engine and a diesel engine.

Here, in order to improve the purifying performance, it is necessary to increase the possibility of contact between exhaust gases and the catalyst noble metal as well as the NOx occlusion agent. For this purpose, it is necessary for the support to have a higher specific surface area and for the noble metal to have a smaller grain size and to be dispersed in a high level. Therefore, there are suggested honeycomb structured bodies in which the cell shape, the cell density, the thickness of cell walls, and the like have been devised (for example, see JP-A 10-263416).

With respect to the honeycomb structured body made of a high specific surface area material, a honeycomb structured body that has been subjected to extrusion molding together with inorganic fibers and an inorganic binder has been known (for example, see JP-A 5-213681). Moreover, in order to allow such a honeycomb structured body to have a large size, a structure in which honeycomb units are jointed to one another through an adhesion layer has been known (for example, see DE 4341159).

Moreover, there has been disclosed a honeycomb filter in which a Young's modulus of an adhesive layer is set to 20% or less of a Young's modulus of a honeycomb unit (for example, see JP-A 2001-190916). The contents of JP-A 10-263416, JP-A 5-213681, DE 4341159, and JP-A 2001-190916 are incorporated herein by reference in their entirety.

SUMMARY OF THE INVENTION

A honeycomb structured body of the present invention is a honeycomb structured body in which a ceramic block with plural pillar-shaped honeycomb units are bonded to one another through sealing material layers, each unit having in the longitudinal direction a large number of cells placed in parallel with a cell wall therebetween, wherein a cross-sectional area of the honeycomb unit on a cross section perpendicular to the longitudinal direction is at least about 5 cm$^2$ and at most about 50 cm$^2$, each of the honeycomb unit includes inorganic fibers and/or whiskers in addition to inorganic particles, and a Young's modulus of the honeycomb unit is at least about 50% and at most about 150% of a Young's modulus of the sealing material layer.

In the above-mentioned honeycomb structured body, it is desirable that the total sum of cross-sectional areas of the honeycomb units on the cross section perpendicular to the longitudinal direction accounts for about 85% or more, more desirably for about 90% or more of the cross-sectional area of the honeycomb structured body on the cross section perpendicular to the longitudinal direction.

In the above-mentioned honeycomb structured body, it is desirable that a coating material layer is formed on the outermost periphery thereof.

It is also desirable that the Young's modulus of the honeycomb unit is at least about 50% and at most about 150% of a Young's modulus of the coating material layer.

In the above-mentioned honeycomb structured body, it is desirable that the inorganic particles comprise of at least one member selected from the group consisting of alumina, silica, zirconia, titania, ceria, mullite and zeolite. The amount of the inorganic particle contained in the honeycomb unit is desirable to be at least about 30% by weight and at most about 97% by weight, more desirable to be at least about 40% by weight and at most about 90% by weight, and further desirable to be at least about 50% by weight and at most about 80% by weight.

In the above-mentioned honeycomb structured body, it is desirable that the inorganic fibers and/or whiskers comprise of at least one member selected from the group consisting of alumina, silica, silicon carbide, silica-alumina, glass, potassium titanate and aluminum borate.

The aspect ratio (length/diameter) of the inorganic fibers and/or whiskers is desirable to be at least about 2 and at most about 1000, more desirable to be at least about 5 and at most about 800, and further desirable to be at least about 10 and at most about 500. The total amount of the inorganic fibers and/or whiskers-contained in the honeycomb unit is desirable to be at least about 3% by weight and at most about 70% by weight, more desirable to be at least about 5% by weight and at most about 50% by weight, and further desirable to be at least about 8% by weight and at most about 40% by weight.

Furthermore, it is desirable that the honeycomb unit contains an inorganic binder. It is desirable that the inorganic binder comprises of at least one member selected from the group consisting of alumina sol, silica sol, titania sol, water glass, sepiolite and attapulgite. The amount of the inorganic binder as solid component of a raw material paste is desirable to be at least about 5% by weight and at most about 50% by weight, more desirable to be at least about 10% by weight and at most about 40% by weight, and further desirable to be at least about 15% by weight and at most about 35% by weight.

On the honeycomb structured body, it is desirable that a catalyst is supported, and that the catalyst contains at least one member selected from the group consisting of noble metal, alkali metal, alkaline earth metal and oxide.

Moreover, it is desirable that the above-mentioned honeycomb structured body is used for exhaust gas conversion of a vehicle.

DESCRIPTION OF THE EMBODIMENTS

Figure 1A:
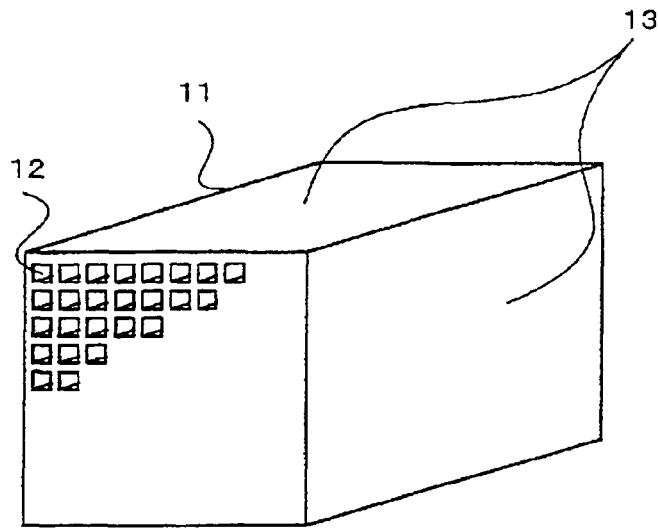
FIG. 1A is a perspective view that schematically shows one example of a honeycomb unit constituting a honeycomb structured body of the present invention.

Hereinafter, description will be given of a honeycomb structured body of the present invention.

The honeycomb structured body of the present invention is a honeycomb structured body in which plural pillar-shaped honeycomb units are bonded to one another through sealing material layers, each unit having in the longitudinal direction a large number of cells placed in parallel with a cell wall therebetween, wherein a cross-sectional area of the honeycomb unit on a cross section perpendicular to the longitudinal direction is at least about 5 $cm^2$ and at most about 50 $cm^2$, each of the honeycomb unit includes inorganic fibers and/or whiskers in addition to inorganic particles, and a Young's modulus of the honeycomb unit is at least about 50% and at most about 150% of a Young's modulus of the sealing material layer.

Since the honeycomb structured body of the present invention is excellent in strength and durability, it is free from damages even upon occurrence of a thermal shock due to a local temperature change in the honeycomb structured body, and is also highly resistant to vibrations.

The honeycomb structured body of the present invention can be especially used conveniently as a catalytic converter.

In the honeycomb structured body of the present invention, since plural honeycomb units are bonded to one another through sealing material layers, it is highly resistant to thermal shocks and vibrations. The reason for this is presumably because, even when a temperature distribution is formed in the honeycomb structured body due to an abrupt temperature change and the like, the temperature difference per honeycomb unit can be reduced to a small level. An alternative presumable reason for this can be because thermal shocks and vibrations can be alleviated by the sealing material layers. Moreover, even when a crack occurs in the honeycomb unit due to a thermal stress and the like, the sealing material layers can prevent the crack from expanding over the entire honeycomb structured body and, so as to maintain the shape of the honeycomb structured body, further serve as frames of the honeycomb structured body, to maintain the function of the honeycomb structured body as a catalyst support.

Moreover, in the honeycomb structured body of the present invention, the Young's modulus of the honeycomb unit is at least about 50% and at most about 150% of the Young's modulus of the sealing material layer.

When the Young's modulus of the honeycomb unit and the Young's modulus of the sealing material layer have the above-mentioned relationship, the sealing material layer is allowed to function as a frame used for maintaining the strength of the honeycomb structured body and/or to function to alleviate a thermal stress generated in the honeycomb structured body; thus, it becomes possible to provide a honeycomb structured body that is excellent in strength and durability.

Moreover, when the Young's modulus of the honeycomb unit is at least about 50% and at most about 150% of the Young's modulus of the sealing material layer, the above-mentioned two functions are exerted. More specifically, when the Young's modulus of the honeycomb unit is about 50% or more and less than about 100% of the Young's modulus of the sealing material layer, the above-mentioned function as the frame greatly devotes to prevention of damages to the honeycomb structured body. In contrast, when the Young's modulus of the honeycomb unit is at least about 100% and at most about 150% of the Young's modulus of the sealing material layer, the function of alleviating a thermal stress generated in the honeycomb structured body greatly devotes to prevention of damages to the honeycomb structured body.

Here, the Young's modulus, which serves as a scale for the strength of a material, is calculated from the initial inclination in a stress-strain curve.

When the Young's modulus of the honeycomb unit is less than about 50% of the Young's modulus of the sealing material layer, the Young's modulus of the sealing material layer becomes too high, failing to sufficiently alleviate a thermal stress generated in the honeycomb structured body, thereby due to the thermal stress, causing damages to the honeycomb structured body. In contrast, when the Young's modulus of the honeycomb unit exceeds about 150% of the Young's modulus of the sealing material layer, the Young's modulus of the sealing material layer becomes too low, and thus, at the time of the generation of a thermal stress in the honeycomb structured body, cracks occur in the sealing material layer before the occurrence thereof in the honeycomb unit, leading to the failure of the sealing material layer to sufficiently function as the frame.

Here, the cross-sectional area of the honeycomb unit on a cross section perpendicular to the longitudinal direction of the honeycomb structured body (hereinafter, referred to simply as cross-sectional area) is about 5 $cm^2$ in lower limit and about 50 $cm^2$ in upper limit. When the cross-sectional area is less than about 5 $cm^2$, the cross-sectional area of the sealing material layers that bond the honeycomb units to one another becomes greater, thereby making the specific surface area on which a catalyst is supported relatively small, while a pressure loss is made to be relatively great. On the other hand, when the cross-sectional area exceeds about 50 $cm^2$, the size of the unit becomes too large, making it difficult to sufficiently suppress the thermal stress generated in each honeycomb unit.

On the other hand, when the cross-sectional area of the honeycomb unit is at least about 5 $cm^2$ and at most about 50 $cm^2$; the ratio of the sealing material layers in the honeycomb structured body can be adjusted, and thus the specific surface area can be maintained at a high level, making it possible to disperse catalyst components in a high level.

Moreover, even when external forces such as thermal shock and vibration are applied thereto, the shape as the honeycomb structured body can be maintained, and a pressure loss can be suppressed to a low level.

Therefore, according to this honeycomb structured body, the catalyst components can be dispersed in a high level and the strength against thermal shock and vibration can be enhanced.

Here, the specific surface area per unit volume can be calculated by the after-mentioned expression (1).

Moreover, when the honeycomb structured body includes plural honeycomb units which have different cross-sectional areas, the cross-sectional area of the honeycomb unit refers to a cross-sectional area of the honeycomb unit that serves as a basic unit constituting the honeycomb structured body, which normally indicates the honeycomb unit having the largest cross-sectional area.

It is desirable that the lower limit of the cross-sectional area is about 6 $cm^2$ and more desirably about 8 $cm^2$. In contrast, it is desirable that the upper limit of the cross-sectional area is about 40 $cm^2$, and more desirably about 30 $cm^2$.

In the above-mentioned honeycomb structured body, it is desirable that the total sum of cross-sectional areas of the honeycomb units accounts for about 85% or more, more desirably for about 90% or more of the cross-sectional area of the honeycomb structured body on the cross section perpendicular to the longitudinal direction.

When the total sum of cross-sectional areas of the honeycomb units accounts for about 85% or more, as the cross-sectional areas of the sealing material layers become small, and the total cross-sectional areas of the honeycomb units become large, the specific surface area used for supporting the catalyst becomes relatively large, while the pressure loss can be controlled to a relatively small value.

When the ratio is about 90% or more, the pressure loss can be made smaller.

In the above-mentioned honeycomb structured body, it is desirable that a coating material layer is formed on the outermost periphery.

The peripheral face can be protected thereby, and the strength can be improved.

When the coating material layer is formed, it is desirable that the Young's modulus of the honeycomb unit is at least about 50% and at most about 150% of the Young's modulus of the coating material layer.

When the Young's modulus of the coating material layer and the Young's modulus of the honeycomb unit satisfy the above-mentioned relationship, the coating material layer also functions as a frame used for maintaining the strength of the honeycomb structured body and/or functions to alleviate a thermal stress generated in the honeycomb structured body; thus, it becomes possible to provide a honeycomb structured body that is more excellent in strength and durability.

The shape of a honeycomb structured body formed by bonding plural honeycomb units to one another is not particularly limited, and may include, for example, a cylindrical shape, a rectangular pillar shape, an elliptic cylinder shape and the like. Moreover, the size thereof is not particularly limited.

The honeycomb units that constitute the honeycomb structured body of the present invention include inorganic fibers and/or whiskers in addition to inorganic particles.

Thus, the specific surface area is improved by the inorganic particles, and the strength of the porous ceramic is improved by the inorganic fibers and/or whiskers.

As the inorganic particles, it is desirable that particles made of alumina, silica, zirconia, titania, ceria, mullite, zeolite, and the like are used. These particles may be used independently, or two or more kinds thereof may be used in combination.

Among these, it is especially desirable to use alumina particles.

As the inorganic fibers and whiskers, it is desirable that inorganic fibers and whiskers made of alumina, silica, silicon carbide, silica-alumina, glass, potassium titanate, aluminum borate and the like are used.

These inorganic fibers and whiskers may be used independently, or two or more kinds thereof may be used in combination.

The aspect ratio (length/diameter) of the above-mentioned inorganic fibers and whiskers is about 2, more desirably about 5, most desirably about 10 in lower limit, and about 1000, more desirably about 800, most desirably about 500 in upper limit.

Here, when there is a distribution in the aspect ratio, the aspect ratio of the inorganic fibers and whiskers is indicated by the average value thereof.

It is desirable that the amount of the inorganic particles contained in the honeycomb unit is about 30% by weight, more desirably about 40% by weight, most desirably about 50% by weight in lower limit.

In contrast, it is desirable that the upper limit thereof is about 97% by weight, more desirably about 90% by weight, most desirably about 80% by weight, and especially desirable when about 75% by weight.

When the content of the inorganic particles is in the range of about 30% by weight to about 97% by weight, the amount of inorganic particles that devote to improvements of the specific surface area becomes relatively large, making the specific surface area of the honeycomb structured body to become large, enabling a catalyst component to disperse in a high level upon supporting the catalyst component. Moreover, the amount of the inorganic fibers and/or whiskers that devote to improvements in strength can be made to become relatively large, and it can further be prevented from the strength of the honeycomb structured body to be reduced.

It is desirable that the total amount of the inorganic fibers and/or whiskers contained in the honeycomb unit is about 3% by weight, more desirably about 5% by weight, most desirably about 8% by weight in lower limit, and that the upper limit thereof is about 70% by weight, more desirably about 50% by weight, most desirably about 40% by weight, and especially desirable when about 30% by weight.

When the total amount of the inorganic fibers and/or whiskers is in the range of about 3% by weight to about 70% by weight, the strength of the honeycomb structured body can be enhanced, and the amount of inorganic particles that devote to improvements of the specific surface area can be made relatively large, making the specific surface area of the honeycomb structured body large, enabling a catalyst component to disperse in a high level upon supporting the catalyst component.

Moreover, it is desirable that the honeycomb unit is manufactured by using a mixture containing the inorganic particles, the inorganic fibers and/or whiskers and an inorganic binder.

By using such a mixture containing the inorganic binder, a honeycomb unit that has sufficient strength can be obtained even when the temperature at which a raw molded body is fired is set to a low level.

As the inorganic binder, an inorganic sol, a clay-type binder and the like can be used, and specific examples of the inorganic sol include, for example, alumina sol, silica sol, titania sol, water glass and the like. Moreover, examples of the clay-type binder include, for example, clays having a double-chain structure, such as clay, kaolin, montmorillonite, sepiolite, attapulgite and the like, and clays of the like. These may be used independently, or two or more kinds thereof may be used in combination.

Among these, it is desirable therefor to comprise of at least one kind selected from the group consisting of alumina sol, silica sol, titania sol, water glass, sepiolite and attapulgite is used.

It is desirable that the amount of the inorganic binder that serves as a solid component of a raw material paste prepared in a manufacturing process which will be described later is about 5% by weight, more desirably about 10% by weight, most desirably about 15% by weight in lower limit, and that the upper limit thereof is about 50% by weight, more desirably about 40% by weight, most desirably about 35% by weight.

When the content of the inorganic binder is about 50% by weight or less, sufficient moldability can be maintained.

Although the shape of the honeycomb unit is not particularly limited, it is preferable to be designed such that the honeycomb units are easily bonded to one another, and examples of the shape of a cross section perpendicular to the longitudinal direction (hereinafter, referred to simply as "cross section") include a square shape, a rectangular shape, a hexagonal shape, a sector shape and the like.

A honeycomb unit having a rectangular parallelepiped shape with a square shape on its cross section is shown in the drawings as one example of the honeycomb unit.

Figure 1B:
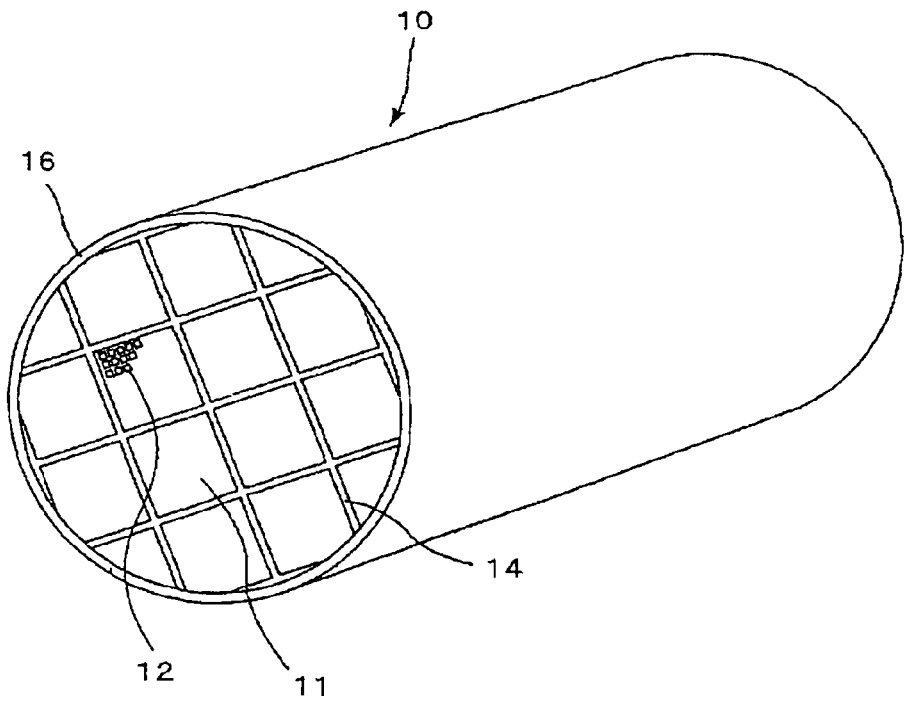
FIG. 1B is a perspective view that schematically shows one example of a honeycomb structured body of the present invention.

FIG. 1A is a perspective view that schematically shows one example of the honeycomb unit that constitutes the honeycomb structured body of the present invention, and FIG. 1B is a perspective view that schematically shows one example of the honeycomb structured body of the present invention.

A honeycomb unit 11 has, from the front side toward the backside, a large number of cells 12, and an outer face 13 without any cells 12.

Although the thickness between the cells 12 (thickness of a cell wall) is not particularly limited, it is desirable to be about 0.05 mm, more desirably about 0.10 mm, most desirably about 0.15 mm in lower limit. In contrast, it is desirable that the upper limit thereof is about 0.35 mm, more desirably about 0.30 mm, most desirably about 0.25 mm.

When the thickness of the cell wall is at least about 0.05 mm and at most about 0.35 mm, the strength of the honeycomb unit can be prevented from being reduced, and since there is an increase in contact area with exhaust gases which leads to gases penetrating deeply enough, contact frequency between the catalyst supported on the inside of the cell wall and gases is enhanced, thereby improving the catalyst performances.

It is desirable that the cell density of the honeycomb unit is about 15.5 cells/cm$^2$ (about 100 cpsi), more desirably about 46.5 cells/cm$^2$ (about 300 cpsi), most desirably about 62.0 cells/cm$^2$ (about 400 cpsi), in lower limit. In contrast, it is desirable that the upper limit of the cell density is about 186 cells/cm$^2$ (about 1200 cpsi), more desirably about 170.5 cells/cm$^2$ (about 1100 cpsi), most desirably about 155 cells/cm$^2$ (about 1000 cpsi).

When the cell density is at least about 15.5 cells/cm$^2$ and at most about 186 cells/cm$^2$, the wall area inside the honeycomb unit that contacts with exhaust gases can be made to become large. Furthermore, the pressure loss can made to become small, making the honeycomb unit fabricated easily.

The cross-sectional shape of cells formed in the honeycomb unit is not particularly limited, and may be formed into an almost triangular shape or an almost hexagonal shape, in addition to a square shape as shown in FIG. 1A.

Next, description for one example of a manufacturing method of the honeycomb structured body of the present invention will be given in the order of processes.

First, a raw material paste is prepared, and by using this raw material paste, extrusion-molding and the like is carried out such that a molded body is manufactured.

The material paste may include, for example, a paste, mainly composed of the inorganic fibers and/or whiskers in addition to the inorganic particles, and in addition to these, according to need and depending on the required moldability, the material paste may contain the inorganic binder, an organic binder, a dispersant and a molding assistant.

Although examples of the organic binder are not particularly limited, they may include, for example, methyl cellulose, carboxymethyl cellulose, hydroxyethyl cellulose, polyethylene glycol, phenol resins, epoxy resins and the like.

These may be used independently, or two or more kinds thereof may be used in combination.

It is preferable that the blending quantity of the organic binder is in the range of 1 to 10 parts by weight out of 100 parts by weight of a total of the inorganic particles, the inorganic fibers, the whiskers and the inorganic binder.

Although examples of the dispersant are not particularly limited, they may include, for example, water, an organic solvent (such as benzene), alcohol (such as methanol) and the like.

Although examples of the above-mentioned molding assistant are not particularly limited, they may include, for example, ethylene glycol, dextrin, fatty acid, fatty acid soap, polyalcohol and the like.

Although not particularly limited, it is preferable that mixing and kneading processes are carried out upon preparing the raw material paste, and for example, the mixing process may be carried out by using a mixer, an attritor and the like, and the kneading process may sufficiently be carried out by using a kneader and the like.

Although the method for molding the raw material paste is not particularly limited, it is preferable that the extrusion-molding process as mentioned above and processes of the like are carried out so that the resulting molded body is molded into a shape with cells formed therein.

Next, according to need, a dried body is obtained by drying the resulting molded body, using a dryer.

Examples of the dryer include a microwave dryer, a hot-air dryer, a dielectric dryer, a reduced-pressure dryer, a vacuum dryer, a freeze dryer and the like.

Next, according to need, the resulting dried body is subjected to a degreasing process.

The degreasing conditions are not particularly limited, and are appropriately determined depending on the kinds and amounts of organic substances contained in the molded body, but it is desirable therefor to be at about 400° C. for about 2 hours.

Next, according to need, the molded body which has been subjected to the drying and degreasing processes, is fired.

Although the firing condition is not particularly limited, it is desirable to be at least about 600° C. and at most about 1200° C., more desirably at least about 600° C. and at most about 1000° C.

The reason for this is because, when the firing temperature is at least about 600° C. and at most about 1200° C., the sintering of ceramic particles and the like progress sufficiently, enhancing the strength of the honeycomb structured body, and on the other hand preventing the specific surface area per unit volume from becoming small due to too much sintering of ceramic particles and the like, thereby enabling the catalyst component to be supported to disperse in a high level.

By using these processes, a pillar-shaped honeycomb unit in which a number of cells are placed in parallel with one another in the longitudinal direction with a cell wall interposed therebetween can be manufactured.

Here, the Young's modulus of the honeycomb unit is determined by the materials contained in the mixed composition and the firing conditions thereof.

Next, a sealing material paste to be used as a sealing material layer is applied to the resulting honeycomb units, so that the honeycomb units are successively bonded to one another. Then, these are dried and secured to manufacture a honeycomb unit united body of a predetermined size in which the honeycomb units are bonded to one another through the sealing material layers.

Although examples of the above-mentioned sealing material paste are not particularly limited, they may include, for example, a paste formed by mixing an inorganic binder and ceramic particles, a paste formed by mixing an inorganic binder and inorganic fibers, a paste formed by mixing an inorganic binder, ceramic particles and inorganic fibers, and pastes of the like.

Moreover, an organic binder may be added to these sealing material pastes.

Although examples of the organic binder are not particularly limited, they may include, for example, polyvinyl alcohol, methyl cellulose, ethyl cellulose, carboxymethyl cellulose and the like.

These may be used independently, or two or more kinds thereof may be used in combination.

It is desirable that the sealing material layer is at least about 0.5 mm and at most about 2 mm in thickness.

When the thickness of the sealing material layer is at least about 0.5 mm and at most about 2 mm, a sufficient joining strength can be obtained, and concerning the fact that the sealing material layer is a portion that does not function as a catalyst support, the specific surface area per unit volume of the honeycomb structured body can be prevented from being reduced, making a catalyst component to disperse sufficiently in a high level at the time of the supporting thereof.

Moreover, since the thickness of the sealing material layer is about 2 mm or less, the pressure loss can also be controlled.

Furthermore, the composition of the sealing material layer is adjusted so that, after a heat treatment, the Young's modulus of the honeycomb unit is at least about 50% and at most about 150% of the Young's modulus of the sealing material layer.

The number of honeycomb units to be bonded to one another is appropriately determined depending on the size of the resulting honeycomb structured body. Here, according to need, a honeycomb unit bonded body in which honeycomb units are bonded to one another through the sealing material layers is appropriately cut and subjected to a polishing process and the like, to prepare honeycomb blocks.

Next, according to need, a coating material paste is applied to the peripheral face of the honeycomb block, and dried and secured thereto, to form a coating material layer.

By the forming of the coating material layer, the peripheral face of the honeycomb block is protected, and as a result, the strength of the honeycomb structured body can be enhanced.

The coating material paste is not particularly limited, and may be made of the same material as the sealing material paste, or may be made of a different material therefrom.

Moreover, when the coating material paste is made of the same material as the sealing material paste, the compounding ratios of constituent components of the two pastes may be the same or may be different from each other.

At the time of forming the coating material layer, it is desirable that the composition of the coating material layer is adjusted so that, after a heat treatment, the Young's modulus of the honeycomb unit is at least about 50% and at most about 150% of the Young's modulus of the coating material layer.

Although the thickness of the coating material layer is not particularly limited, it is desirable to be at least about 0.1 mm and at most about 2 mm. Since the thickness is at least about 0.1 mm and at most about 2 mm, the outer circumferential face can be protected, while strength of the honeycomb structured body can be enhanced, and furthermore, reduction of the specific surface area per unit volume of the honeycomb structured body can be controlled, making a catalyst component to disperse sufficiently in a high level upon the supporting thereof.

In this manufacturing method, it is desirable that, after plural honeycomb units have been bonded to one another through sealing material layers (when a coating material layer is provided, after the coating material layer has been formed), calcination is carried out.

An organic binder contained in the sealing material layer and the coating material layer can thereby be degreased, leading to removal thereof.

The conditions of the calcination is determined appropriately in accordance with the kinds and amounts of organic substances to be contained therein, and it is desirable therefor to be at about 700° C. for about 2 hours.

Here, as one example of the honeycomb structured body, referring to FIG. 1B, description of a honeycomb structured body in which plural honeycomb units are bonded to one another into a cylindrical contour, each unit having a rectangular parallelepiped shape with a square cross section, will be given.

The honeycomb structured body 10 is prepared by the following processes: honeycomb units 11 are bonded to one another through sealing material layers 14, and after having been cut into a cylindrical shape, the peripheral face of the ceramic block of which cells 12 are not formed is covered with a coating material layer 16.

Moreover, in the above-mentioned manufacturing method, a honeycomb structured body having a predetermined shape (for example, a cylindrical shape as in FIG. 1B) may be manufactured by forming honeycomb units having a cross section with a sector shape or honeycomb units having a cross section with a square shape preliminarily, and bonding them to one another through sealing material layers.

In this case, cutting and polishing processes can be omitted.

Although the use of such honeycomb structured body of the present invention is not particularly limited, it can be suitably used as a catalyst support for exhaust gas conversion of a vehicle.

When used as a catalyst support for exhaust gas conversion of a diesel engine, the honeycomb structured body is sometimes used together with a diesel particulate filter (DPF) that has a ceramic honeycomb structure made of silicon carbide and the like and also has a function of filtering and burning particulate matters (PMs) in exhaust gases, and in such a case, the positional relationship between the honeycomb structured body of the present invention and the DPF may be such that the honeycomb structured body of the present invention is placed on either the front side (close side to the engine) or the rear side (far side to the engine) of the DPF.

When placed on the front side (close side), heat generated through the reaction of the honeycomb structured body of the present invention is transmitted to the DPF on the rear side (far side), and the temperature raising process at the time of regeneration of the DPF can be accelerated.

In contrast, when placed on the rear side (far side), PMs in exhaust gases are filtered through the DPF, and pass through the cells of the honeycomb structured body of the present invention thereafter; therefore, clogging hardly occurs, and gas components generated through incomplete combustion upon burning PMs in the DPF, are also processed by using the honeycomb structured body of the present invention.

Here, the honeycomb structured body can of course be utilized for the purposes and the like described in the aforementioned Background Art, and may also be utilized without being particularly limited. As one example thereof, the honeycomb structured body can be used for purposes in which no catalyst component is supported thereon (for example, adsorbent that adsorbs gaseous components and liquid components, and the like).

Moreover, a catalyst may be supported on the honeycomb structured body so that it can be used as a honeycomb catalyst.

Although examples of the catalyst are not particularly limited, they include, for example, noble metal, alkali metal, alkaline earth metal, oxides and the like.

These materials may be used independently, or two or more kinds of these may be used in combination.

Examples of the above-mentioned noble metal include platinum, palladium, rhodium and the like. Examples of the alkali metal include potassium, sodium and the like. Examples of the alkaline earth metal include barium and the like. Examples of the oxide include perovskite (such as $La_{0.75}K_{0.25}MnO_3$), $CeO_2$ and the like.

Although not particularly limited, the above-mentioned honeycomb structured body (honeycomb catalyst) on which a catalyst is supported is used as so-called three-way catalyst and NOx-occlusion catalyst, used for exhaust gas conversion of a vehicle.

Here, the timing in which the catalyst is supported is not particularly limited, and the supporting process may be carried out after the honeycomb structured body has been manufactured or on inorganic particles serving as the raw material.

Moreover, the supporting method of the catalyst is not particularly limited, and for example, an impregnation method and the like may be used.

EXAMPLES

Hereinafter, description of the present invention will be given in detail by means of examples; however, the present invention is not intended to be limited by these examples.

First, by the following methods, pastes A to E were prepared as sealing material pastes/coating material pastes.
(Preparation of Paste A)
45% by weight of γ-alumina particles (average particle diameter: 2 μm), 5% by weight of alumina fibers (average fiber diameter: 5 μm, average fiber length: 50 μm), 17% by weight of silica sol (solid concentration: 30% by weight), 3% by weight of ceramic balloons (mean particle diameter: 75 μm), 5% by weight of carboxymethyl cellulose (CMC) and 25% by weight of water were mixed to prepare a paste A.
(Preparation of Paste B)
40% by weight of γ-alumina particles, 5% by weight of silica-alumina fibers (average fiber diameter: 10 μm, average fiber length: 100 μm), 25% by weight of silica sol, 5% by weight of CMC and 25% by weight of water were mixed to prepare a paste B.
(Preparation of Paste C)
29% by weight of γ-alumina particles, 7% by weight of silica-alumina fibers, 34% by weight of silica sol, 5% by weight of CMC and 25% by weight of water were mixed to prepare a paste C.
(Preparation of Paste D)
15% by weight of SiC particles (average particle diameter: 0.5 μm), 45% by weight of aluminum borate whisker (average fiber diameter: 0.5 μm, average fiber length: 20 μm), 10% by weight of silica sol, 5% by weight of CMC and 25% by weight of water were mixed to prepare a paste D.

(Preparation of Paste E)
5% by weight of SiC particles, 50% by weight of aluminum borate whisker, 15% by weight of silica sol, 5% by weight of CMC and 25% by weight of water were mixed to prepare a paste E.

Here, a Young's modulus (GPa) of each of pastes A to E that have been subjected to a heat treatment as adhesive layers is shown in Table 1. Moreover, Table 1 also shows compositions of the pastes A to E.

TABLE 1

| | Paste | | | | |
|---|---|---|---|---|---|
| | A | B | C | D | E |
| Young's modulus (Gpa) | 9.0 | 8.0 | 4.0 | 3.0 | 2.0 |
| γ-alumina particles (average particle diameter: 2 μm) | 45 | 40 | 29 | — | — |
| SiC particles (average particle diameter: 0.5 μm) | — | — | — | 15 | 5 |
| Silica-alumina fibers (fiber diameter: 10 μm, fiber length: 100 μm) | — | 5 | 7 | — | — |
| Alumina fibers (fiber diameter: 5 μm, fiber length: 50 μm) | 5 | — | — | — | — |
| Aluminum borate whisker (fiber diameter: 0.5 μm, fiber length: 20 μm) | — | — | — | 45 | 50 |
| Silica sol (solid concentration: 30% by weight) | 17 | 25 | 34 | 10 | 15 |
| Ceramic balloons (particle size: 75 μm) | 3 | — | — | — | — |
| CMC (Carboxymethyl cellulose) | 5 | 5 | 5 | 5 | 5 |
| Water | 25 | 25 | 25 | 25 | 25 |

Note)
The amount of blend of each of blended components is indicated by % by weight.

Example 1

(1) 40% by weight of γ-alumina particles (average particle diameter: 2 μm), 10% by weight of silica-alumina fibers (average fiber diameter: 10 μm, average fiber length: 100 μm, aspect ratio: 10) and 50% by weight of silica sol (solid concentration: 30% by weight) were mixed, and to 100 parts by weight of the resulting mixture were added 6 parts by weight of methylcellulose serving as an organic binder and a slight amount of a plasticizer and a lubricant, and the mixture was further mixed and kneaded to obtain a mixed composition. This mixed composition was extrusion-molded by using an extrusion molding machine, so that a raw molded product was obtained.

(2) Next, the above-mentioned raw molded product was sufficiently dried by using a micro-wave dryer and a hot-air dryer, and further maintained at 400° C. for 2 hours to be degreased.

Thereafter, this was maintained at 800° C. for 2 hours to be fired, so that a honeycomb unit 11, which had a rectangular pillar shape (34.3 mm×34.3 mm×150 mm), a cell density of 93 cells/cm² (600 cpsi) and a cell wall of 0.2 mm in thickness, with the cross-sectional shape of the cell being formed into a quadrangular shape (square), was obtained.

Figure 2:
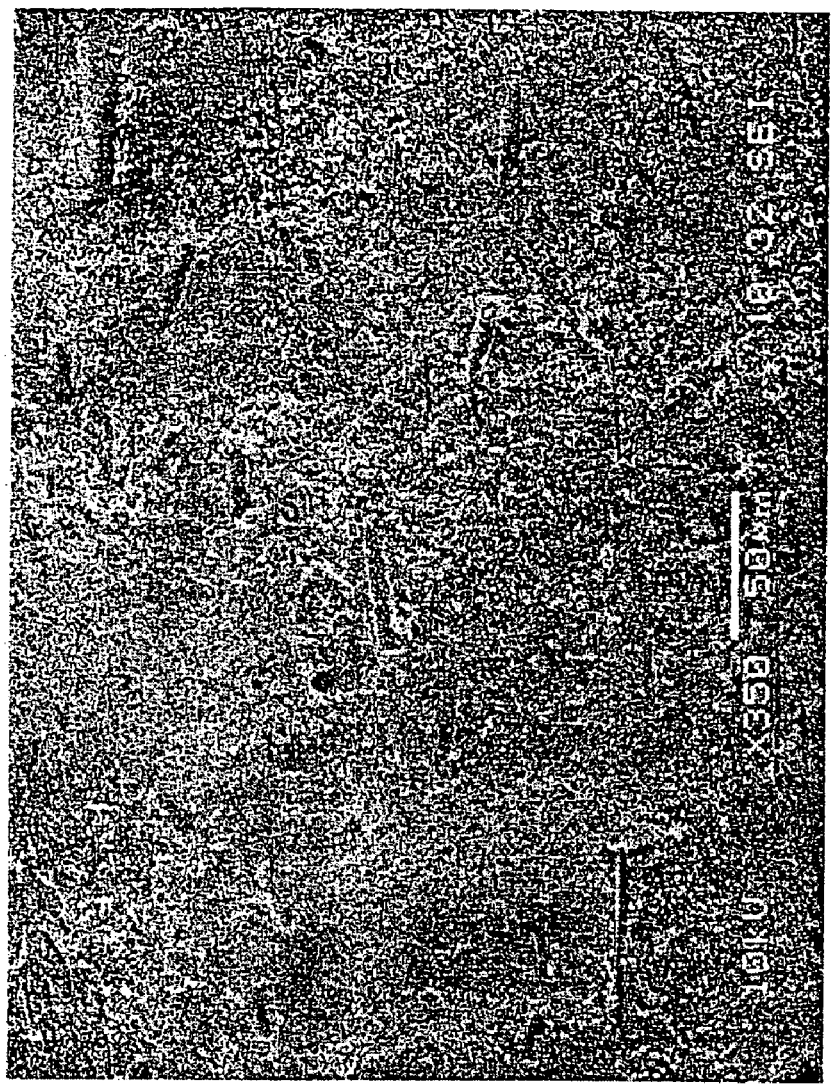
FIG. 2 is a scanning electron microscopic (SEM) photograph that shows cell walls of a honeycomb unit in accordance with Example 1.

FIG. 2 shows a scanning electron microscope (SEM) photograph of the wall face of this honeycomb unit 11.

This photograph indicates that in the honeycomb unit 11, the silica-alumina fibers are oriented along the extrusion direction of the raw material paste.

Here, the Young's modulus of the honeycomb unit manufactured through the present processes was 4.2 GPa.

(3) Next, plural honeycomb units 11 were bonded to one another by using the above-mentioned paste C as a sealing material paste, so that a honeycomb block was prepared.

Figure 3A:
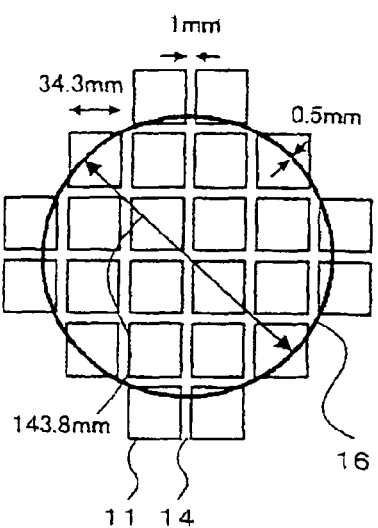
FIGS. 3A to 3C are explanatory views that indicate an experimental example in which plural honeycomb units are bonded to one another.

FIG. 3A shows a honeycomb block having the plural honeycomb units 11 bonded to one another, which is viewed from a face having cells (hereinafter, defined as the front face).

This honeycomb block has a structure in which a sealing material paste (paste C) is applied to the outer face 13 of the honeycomb unit 11 so as to form a sealing-material layer 14 of 1 mm in thickness, and the plural honeycomb units 11 were bonded to one another and secured thereafter.

(4) After such a honeycomb block had been fabricated, this honeycomb block was cut into a column shape by using a diamond cutter so that the front face of the honeycomb block had an almost point-symmetric pattern; thereafter, the above-mentioned paste C was applied as the coating material paste onto the outer surface of the circle (peripheral face of the ceramic block) in which cells are not formed, such that it is 0.5 mm in thickness, and thus the outer surface was coated.

(5) Next, a honeycomb structured body 10 having a cylindrical shape (143.8 mm in diameter×150 mm in height) was obtained by drying at 120° C., and maintaining at 700° C. for 2 hours, so that the sealing material paste and the coating material paste were degreased.

Table 2 collectively shows various numeric values concerning: the cross-sectional shape of the honeycomb unit, the cross-sectional area of the honeycomb unit, the cross-section occupied ratio of the honeycomb unit (the ratio of the total sum of the cross-sectional areas of the honeycomb units in the cross-sectional area of the honeycomb structured body), the total cross-section occupied ratio of the sealing material layers and the coating material layers (the ratio of the total sum of the cross-sectional areas of the sealing material layers and the coating material layers in the cross-sectional area of the honeycomb structured body) and the ratio of a Young's modulus (the Young's modulus of the honeycomb unit to the Young's modulus of the sealing material layer) of the honeycomb structured body manufactured in this Example.

Here, Table 2 also shows numeric values of other examples and comparative examples.

Examples 2, 3

A honeycomb structured body was manufactured through the same processes as Example 1, except that the shape of the honeycomb unit was as shown in Table 2.

Figure 3B:
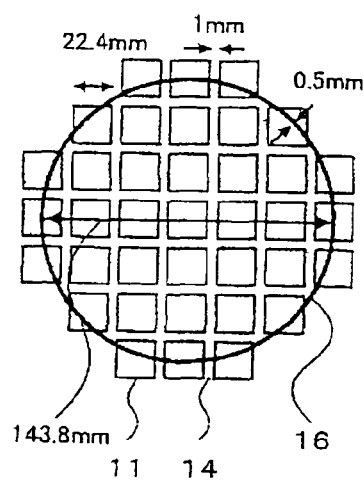
Figure 3C:
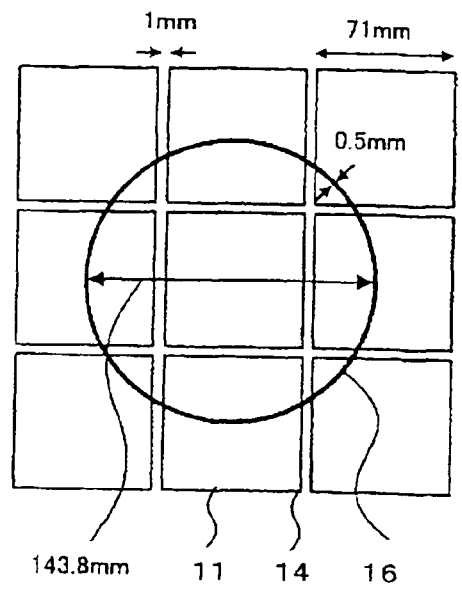

Here, FIGS. 3B and 3C show schematic diagrams viewed from the front side of honeycomb blocks according to Examples 2 and 3, respectively.

Example 4

A honeycomb structured body was manufactured through the same processes as Example 1, except that the above-mentioned paste B was used as the sealing material paste and coating material paste.

Example 5

A honeycomb structured body was manufactured through the same processes as Example 1, except that the above-mentioned paste D was used as the sealing material paste and coating material paste.

Comparative Example 1

A honeycomb structured body was manufactured through the same processes as Example 1, except that the above-mentioned paste A was used as the coating material paste.

Comparative Example 2

A honeycomb structured body was manufactured through the same processes as Example 1, except that the above-mentioned paste E was used as the sealing material paste and coating material paste.

Comparative Examples 3, 4

A honeycomb structured body was manufactured through the same processes as Example 1, except that the shape of the honeycomb unit was as shown in Table 2.

Figure 4A:
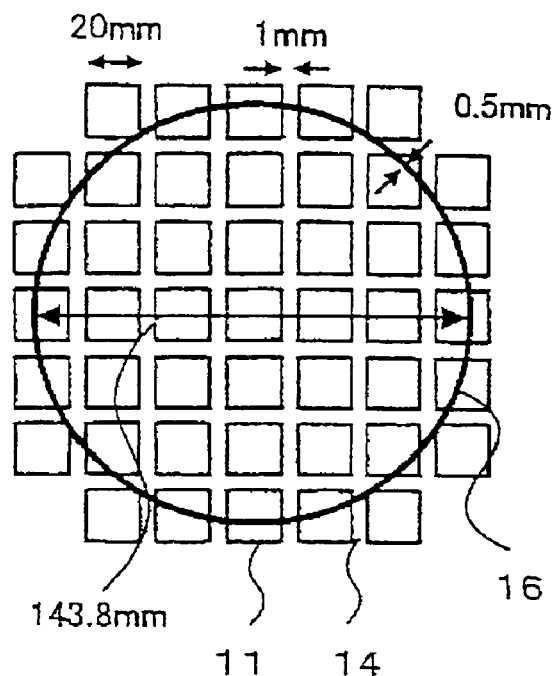
FIGS. 4A and 4B are explanatory views that indicate a comparative example in which plural honeycomb units are bonded to one another.
Figure 4B:
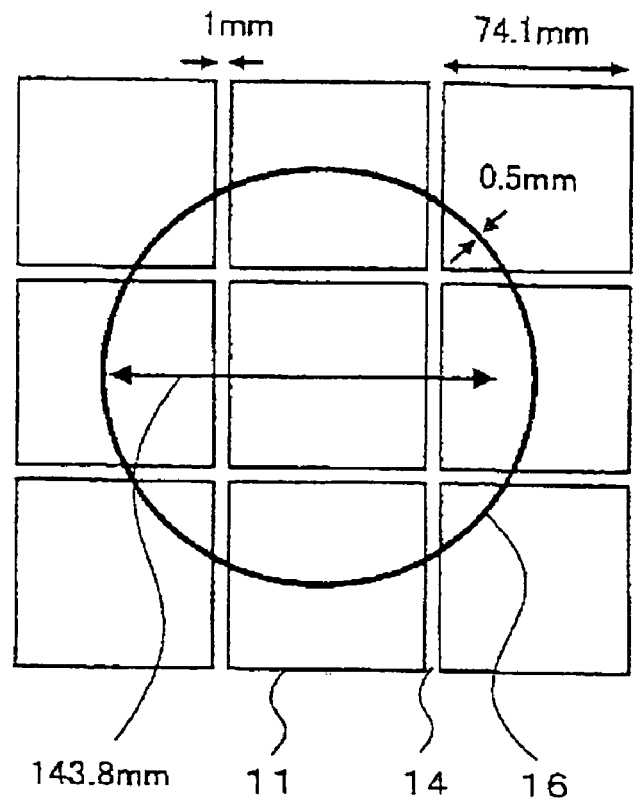

Here, FIGS. 4A and 4B show schematic diagrams viewed from the front side of honeycomb blocks according to Comparative Examples 3 and 4, respectively.

TABLE 2

| | Honeycomb unit | | | Sealing material layer/ coating material layer | | |
|---|---|---|---|---|---|---|
| | Cross-sectional shape | Cross-sectional area | Cross-section occupied ratio | Thickness (sealing material layer/coating material layer) | Total cross-section occupied ratio | Young's modulus ratio (%) (Note 1) |
| Example 1 | 3.43 cm square | 11.8 cm² | 93.5% | 1 mm/0.5 mm | 6.5% | 105 |
| Example 2 | 2.24 cm square | 5.0 cm² | 90.2% | 1 mm/0.5 mm | 9.8% | 105 |
| Example 3 | 7.10 cm square | 50.0 cm² | 95.5% | 1 mm/0.5 mm | 4.5% | 105 |
| Example 4 | 3.43 cm square | 11.8 cm² | 93.5% | 1 mm/0.5 mm | 6.5% | 53 |
| Example 5 | 3.43 cm square | 11.8 cm² | 93.5% | 1 mm/0.5 mm | 6.5% | 140 |
| Comparative Example 1 | 3.43 cm square | 11.8 cm² | 93.5% | 1 mm/0.5 mm | 6.5% | 47 |
| Comparative Example 2 | 3.43 cm square | 11.8 cm² | 93.5% | 1 mm/0.5 mm | 6.5% | 210 |
| Comparative Example 3 | 2.00 cm square | 4.0 cm² | 89.7% | 1 mm/0.5 mm | 10.3% | 105 |
| Comparative Example 4 | 7.41 cm square | 55.0 cm² | 95.6% | 1 mm/0.5 mm | 4.4% | 105 |

(Note 1)
Young's modulus ratio: Young's modulus of honeycomb unit to Young's modulus of sealing material layer Evaluation of Honeycomb Structured Body Measurements on specific surface area, thermal shock/vibration repetitive tests and measurements on pressure loss were carried out on the honeycomb structured bodies thus manufactured in the Examples and the Comparative Examples, by using the following methods. The results are shown in Table 3.

[Measurements on Specific Surface Area]

First, volumes of honeycomb units and sealing material layers were actually measured, and a ratio A (vol %) of the honeycomb units in the volume of the honeycomb structured body was calculated. Next, a BET specific surface area B ($m^2/g$) per unit weight of the honeycomb unit was measured. The BET specific surface area was measured through a one-point method in compliance with JIS-R-1626 (1996) defined by Japanese Industrial Standard, by using a BET measuring device (Micromeritics FlowSorb II-2300, made by Shimadzu Corp.). Upon measuring, samples prepared by cutting out cylindrical-shaped small pieces (15 mm in diameter×15 mm in height) were used. Then, the apparent density C (g/L) of the honeycomb unit was calculated through the weight and the volume decided by the shape of the honeycomb units, and the specific surface area S ($m^2/L$) of the honeycomb structured body was calculated from the following expression (1). Here, the specific surface area of the honeycomb structured body refers to a specific surface area per apparent volume of the honeycomb structured body.

$$S(m^2/L)=(A/100) \times B \times C \tag{1}$$

The contents of the JIS-R-1626 (1996) are incorporated herein by reference in their entirety.

[Thermal Shock/Vibration Repetitive Test]

Figure 5A:
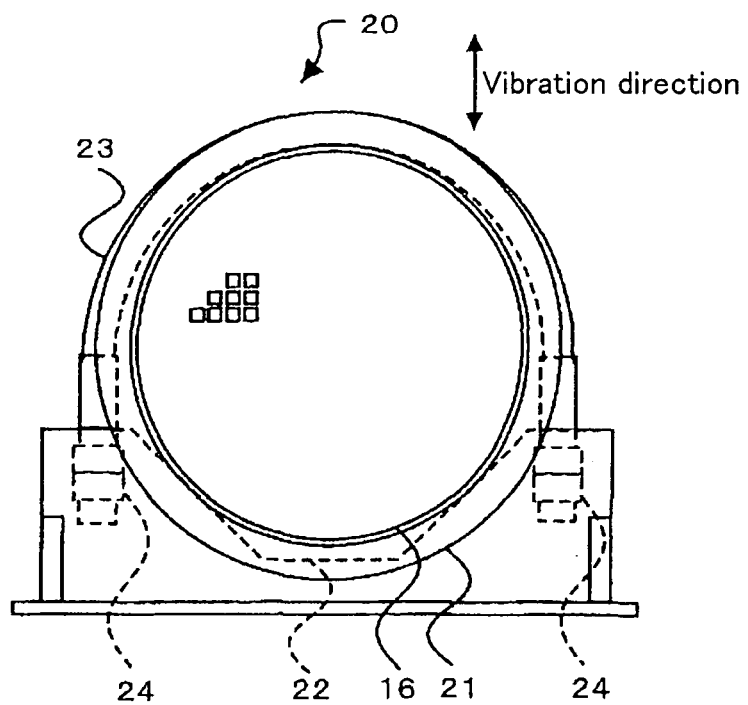
FIG. 5A is a front view of a vibration device used for a vibration test.
Figure 5B:
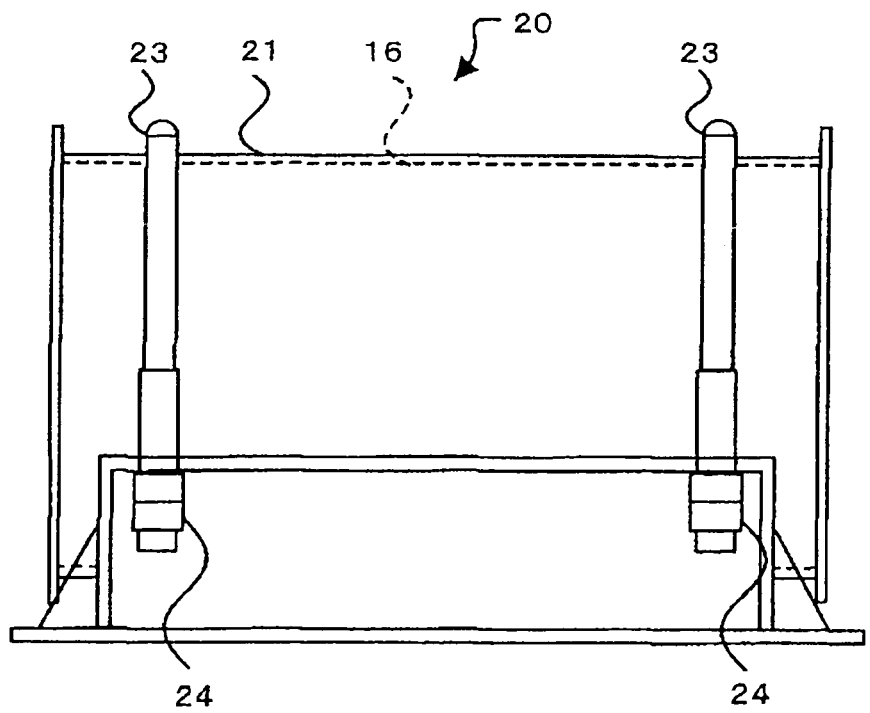
FIG. 5B is a side view of the vibration device.

In a thermal shock test, a honeycomb structured body, being kept in a metal casing 21, with an alumina mat (MAFTEC, 46.5 cm×15 cm, thickness 6 mm, made by Mitsubishi Chemical Corp.), which is a heat-insulating material made of alumina fibers, wound around the peripheral face thereof was put into a firing furnace set at 600° C., and was heated for 10 minutes, and then taken out from the firing furnace and quenched to room temperature. Next, a vibration test was carried out by keeping the honeycomb structured body in this metal casing. FIG. 5A is a front view that shows a vibration testing device 20 used for the vibration test, and FIG. 5B is a side view that shows the vibration testing device 20. The metal casing 21 which held the honeycomb structured body therein was placed on a mount 22, and the metal casing 21 was secured thereon by tightening a securing member 23 having an almost U-shape with a screw 24. Thus, the metal casing 21 was allowed to vibrate with the mount 22 and the securing member 23 being integrally held together therewith. The vibration test was carried out under conditions of a frequency of 160 Hz, an acceleration of 30 G, an amplitude of 0.58 mm and a retention time of 10 hr, at room temperature, and in a vibration direction of the Z-axis direction (up and down). 10 times each of these thermal shock test and vibration test were repeated alternately, and the weight T0 before the tests and the weight Ti after the tests were measured, and the weight reduction ratio G was calculated by using the following expression (2).

$$G(wt\%)=100 \times (T0-Ti)/T0 \tag{2}$$

[Pressure Loss Measurement]

Figure 6:
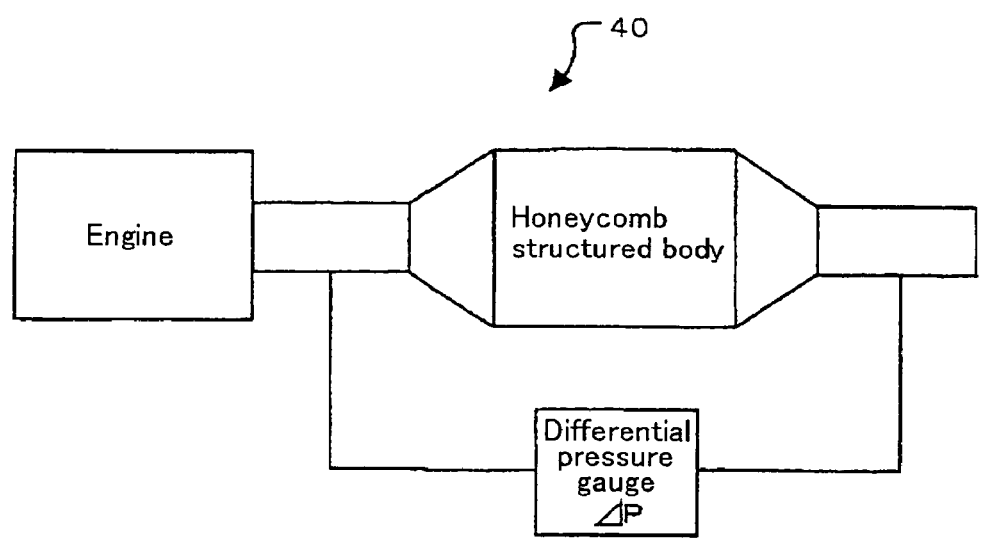
FIG. 6 is a schematic diagram that shows a pressure-loss measuring device.

A pressure-loss measuring device 40 is shown in FIG. 6. In this measuring method, a honeycomb structured body with an alumina mat being wound thereon, which was put into a metal casing, was placed in an exhaust pipe of a common rail-type diesel engine of 2 L, and pressure meters were attached to front and rear sides of the honeycomb structured body. With respect to the measuring conditions, the engine revolution was set to 1500 rpm and the torque was set to 50 Nm, and a differential pressure after a lapse of 5 minutes from the start up was measured.

TABLE 3

| | Specific surface area ($m^2/L$) | | Reduction ratio G (wt %) | |
|---|---|---|---|---|
| | Honeycomb unit | Honeycomb structured body | after thermal shock/vibration tests | Pressure loss (kPa) |
| Example 1 | 42000 | 39270 | 0 | 2.4 |
| Example 2 | 42000 | 37884 | 0 | 2.5 |
| Example 3 | 42000 | 40110 | 3 | 2.3 |
| Example 4 | 42000 | 39270 | 5 | 2.4 |
| Example 5 | 42000 | 39270 | 7 | 2.4 |
| Comparative Example 1 | 42000 | 39270 | 35 | 2.4 |
| Comparative Example 2 | 42000 | 39270 | 27 | 2.4 |
| Comparative Example 3 | 42000 | 37674 | 0 | 2.8 |
| Comparative Example 4 | 42000 | 40152 | 52 | 2.3 |

As clearly indicated by the above-mentioned test results, in the honeycomb structured bodies according to Examples 1 to 5, the weight reduction ratio G in the thermal shock/vibration tests was small; thus, the honeycomb structured bodies were highly resistant to thermal shocks and vibrations, and excellent in durability.

In contrast, in the honeycomb structured bodies according to Comparative Examples 1, 2 and 4, the weight reduction ratio G in the thermal shock/vibration tests was large, resulting in degradation in strength and durability. This is presumably because the Young's modulus ratio is not in the range of 50 to 150% (Comparative Examples 1 and 2) or because the cross-sectional area of the honeycomb unit exceeds 50 $cm^2$ (Comparative Example 4).

Moreover, although the weight reduction ratio G in the thermal shock/vibration tests was small in the honeycomb structured body according to Comparative Example 3, there was degradation in the pressure loss in comparison with the honeycomb structured bodies according to the Examples. This is presumably because, since the cross-sectional area of the honeycomb units is small, the cross-section occupied ratio of the honeycomb units becomes inevitably small, and a high pressure loss occurs as a result thereof.

Additionally, the thermal shock/vibration tests of these Examples are tests to evaluate the strength and durability of the honeycomb structured body by using the weight reduction ratio G as an index, and these tests make it possible to evaluate the strength and durability of the honeycomb structured body by using the weight reduction ratio G as the index because, at the time of the occurrence of a crack in the honeycomb structured body due to a thermal shock, there is a weight reduction in a portion of the honeycomb structured body which is damaged by the expanding of the crack due to vibrations.

What is claimed as new and desired to be secured by Letters Patent of the United States is:

1. A honeycomb structured body in which plural pillar-shaped honeycomb units are bonded to one another through sealing material layers, each unit having in the longitudinal direction a large number of cells placed in parallel with a cell wall therebetween, wherein:

all of the cells are open on an end face of the honeycomb unit, a cross-sectional area of said honeycomb unit on a cross section perpendicular to the longitudinal direction ranges from about 5 cm$^2$ and to about 50 cm$^2$, a specific surface area per unit volume of the honeycomb structured body ranges from 37,884 m$^2$/L to 40,110 m$^2$/L, each of said honeycomb unit comprises inorganic particles and at least one member chosen from inorganic fibers and whiskers, said inorganic particles comprises at least one member chosen from alumina, silica, zirconia, titania, ceria, mullite, and zeolite, said honeycomb unit is fired at a temperature ranging from 600° C. to 1200° C., and a Young's modulus of said honeycomb unit is at least about 50% and at most about 140% of a Young's modulus of said sealing material layer.

2. The honeycomb structured body according to claim 1, wherein the total sum of cross-sectional areas of said honeycomb units on the cross section perpendicular to the longitudinal direction accounts for about 85% or more of the cross-sectional area of said honeycomb structured body on the cross section perpendicular to the longitudinal direction.

3. The honeycomb structured body according to claim 1, wherein the total sum of cross-sectional areas of said honeycomb units on the cross section perpendicular to the longitudinal direction accounts for about 90% or more of the cross-sectional area of said honeycomb structured body on the cross section perpendicular to the longitudinal direction.

4. The honeycomb structured body according to claim 1, wherein a coating material layer is formed on an outermost periphery of the honeycomb structured body.

5. The honeycomb structured body according to claim 4, wherein said Young's modulus of said honeycomb unit is at least about 50% and at most about 150% of a Young's modulus of said coating material layer.

6. The honeycomb structured body according to claim 1, wherein the amount of said inorganic particles contained in said honeycomb unit is at least about 30% by weight and at most about 97% by weight.

7. The honeycomb structured body according to claim 6, wherein the amount of said inorganic particle contained in said honeycomb unit is at least about 40% by weight and at most about 90% by weight.

8. The honeycomb structured body according to claim 6, wherein the amount of said inorganic particles contained in said honeycomb unit is at least about 50% by weight and at most about 80% by weight.

9. The honeycomb structured body according to claim 1, wherein said inorganic fibers and/or whiskers comprise of at least one member selected from the group consisting of alumina, silica, silicon carbide, silica-alumina, glass, potassium titanate and aluminum borate.

10. The honeycomb structured body according to claim 1, wherein the aspect ratio (length/diameter) of said inorganic fibers and/or whiskers is at least about 2 and at most about 1000.

11. The honeycomb structured body according to claim 10, wherein the aspect ratio (length/diameter) of said inorganic fibers and/or whiskers is at least about 5 and at most about 800.

12. The honeycomb structured body according to claim 10, wherein the aspect ratio (length/diameter) of said inorganic fibers and/or whiskers is at least about 10 and at most about 500.

13. The honeycomb structured body according to claim 1, wherein the total amount of said inorganic fibers and/or whiskers contained in said honeycomb unit is at least about 3% by weight and at most about 70% by weight.

14. The honeycomb structured body according to claim 13, wherein the total amount of said inorganic fibers and/or whiskers contained in said honeycomb unit is at least about 5% by weight and at most about 50% by weight.

15. The honeycomb structured body according to claim 13, wherein the total amount of said inorganic fiber and/or whiskers contained in said honeycomb unit is at least about 8% by weight and at most about 40% by weight.

16. The honeycomb structured body according to claim 1, wherein said honeycomb unit further contains an inorganic binder.

17. The honeycomb structured body according to claim 16, wherein said inorganic binder comprises of at least one member selected from the group consisting of alumina sol, silica sol, titania sol, water glass, sepiolite and attapulgite.

18. The honeycomb structured body according to claim 16, wherein the amount of said inorganic binder as solid component of a raw material paste is at least about 5% by weight and at most about 50% by weight.

19. The honeycomb structured body according to claim 18, wherein the amount of said inorganic binder as solid component of a raw material paste is at least about 10% by weight and at most about 40% by weight.

20. The honeycomb structured body according to claim 18, wherein the amount of said inorganic binder as solid component of a raw material paste is at least about 15% by weight and at most about 35% by weight.

21. The honeycomb structured body according to claim 1, on which a catalyst is supported.

22. The honeycomb structured body according to claim 21, wherein said catalyst contains at least one member selected from the group consisting of noble metal, alkali metal, alkaline earth metal and oxide.

23. The honeycomb structured body according to claim 1, which is used for exhaust gas conversion of a vehicle.

24. A method of manufacturing a honeycomb structured body, comprising:

obtaining a plurality of pillar-shaped honeycomb units, firing said honeycomb units at a temperature ranging from 600° C. to 1200° C., obtaining a sealing material, and binding the plurality of pillar-shaped honeycomb units together by interposing between adjacent honeycomb units a layer of said sealing material, wherein in said honeycomb structured body the Young's modulus of the honeycomb unit ranges from about 50% to about 140% of a Young's modulus of the sealing material layer, all of the cells are open on an end face of the honeycomb unit, each of said honeycomb unit comprises inorganic particles and at least one member chosen from inorganic fibers and whiskers, said inorganic particles comprises at least one member chosen from alumina, silica, zirconia, titania, ceria, mullite, and zeolite, a cross-sectional area of said honeycomb unit on a cross section perpendicular to the longitudinal direction ranges from about 5 cm$^2$ and to about 50 cm$^2$, and a specific surface area per unit volume of the honeycomb structured body ranges from 37,884 m$^2$/L to 40,110 m$^2$/L.

* * * * *